United States Patent [19]
Moore

[11] 3,855,355
[45] Dec. 17, 1974

[54] PROCESS FOR PREPARING GRAFT COPOLYMERS IN AQUEOUS EMULSION
[75] Inventor: John David Moore, Southampton, England
[73] Assignee: The International Synthetic Rubber Company Limited, Southampton, England
[22] Filed: May 11, 1972
[21] Appl. No.: 252,225

[30] Foreign Application Priority Data
May 14, 1971 Great Britain .................. 15073/71

[52] U.S. Cl. ............................ 260/880 R, 260/879
[51] Int. Cl. ....... C08f 19/08, C08f 19/18, C08f 1/13
[58] Field of Search ................................ 260/880 R

[56] References Cited
UNITED STATES PATENTS

| | | | |
|---|---|---|---|
| 3,168,593 | 2/1965 | Fremon et al. ................. | 260/880 R |
| 3,278,642 | 10/1966 | Lee .................................. | 260/880 |
| 3,288,887 | 11/1966 | Yoshimo et al. .................. | 260/880 |
| 3,442,979 | 5/1969 | Ott et al. ......................... | 260/880 |
| 3,636,138 | 1/1972 | Beer ................................. | 260/880 |

Primary Examiner—James A. Seidleck
Attorney, Agent, or Firm—Cushman, Darby & Cushman

[57] ABSTRACT

In the preparation of ABS from a rubbery polybutadiene latex improved physical properties, in particular, improved impact strenght, are obtained by:

1. admixing some or all of the styrene to be grafted with the latex in the absence of acrylonitrile 2. contacting the mixture so formed, after an imbibing time of from 5 minutes to 20 hours, with acrylonitrile and the balance, if any, of the styrene, and 3. grafting the styrene and acrylonitrile onto the polybutadiene.

The process is particularly applicable to a latex having a number average particle diameter of at least 1,500A, a weight average particle diameter of 2500–3000 A, a gel content of 60 to 90 percent and swelling index to 10 to 30. Such a latex may be obtained by the process of U.S. Patent application No. of Bennett and Duck entitled "LATEX PREPARATION" filed May 5, 1972.

11 Claims, No Drawings

PROCESS FOR PREPARING GRAFT COPOLYMERS IN AQUEOUS EMULSION

The invention relates to the preparation of graft copolymers and in particular it relates to the grafting of styrene and acrylonitrile onto a rubbery polybutadiene latex to form an acrylonitrile-butadiene-styrene graft copolymer (ABS).

It is well known in the preparation of ABS to graft styrene and acrylonitrile onto a rubbery polybutadiene latex. Prior to the grafting reaction the latex is generally admixed with the styrene and acrylonitrile and the mixture is usually allowed to stand for a period of up to several hours to enable the rubber particles to absorb the monomers before reaction is initiated. This absorption process is known as imbibition and the period of imbibition is generally called the imbibing time.

We have found that by following a particular imbibition procedure it is possible to obtain improved physical properties, in particular, improved impact strength, in the final thermoplastic.

According to the present invention, a process for preparing an acrylonitrile-butadiene-styrene (ABS) graft copolymer from a rubbery polybutadiene latex comprises:

1. admixing with the latex, in the absence of acrylonitrile, some or all of the styrene to be grafted.
2. contacting the mixture so formed after an imbibing time of from 5 minutes to 20 hours with acrylonitrile and the balance, if any, of the styrene, and
3. grafting the styrene and acrylonitrile onto the polybutadiene.

The amount of styrene admixed with the latex in step (1) of the process is at least 30 parts per hundred parts of rubber (phr) and may be all or only some of the styrene content desired in the final graft copolymer. Where only some of the styrene desired in the final graft copolymer is admixed with the latex in step (1) the balance is added in step (2) of the process or during the grafting reaction. Generally, the total amount of styrene added in steps (1) and (2) does not exceed 300 phr in total.

The imbibing time, which is the period allowed for the styrene and latex mixture to imbibe in the absence of acrylonitrile, may be from 5 minutes to 20 hours. Imbibing times of e.g., 1 to 16 hours or more are generally used where only a small amount, e.g. 30 to 100 phr, of styrene is admixed with the latex in step (1). Advantageously, the imbibing time in such cases is as short as possible and generally imbibing times of e.g. 1 to 5 hours are preferred. Where larger amounts of styrene, e.g. 100 to 300 phr, are used in step (1) the imbibing time is generally shorter, e.g. 5 to 40 minutes. Care must be taken not to over imbibe the latex by using excessive amounts of styrene and/or excessive imbibing times since this generally leads to latex instability resulting in it being difficult, if not impossible, to graft the latex without coagulation and, in any case, generally has an adverse effect on the properties of the ABS.

In step (2) of the process the rubbery polybutadiene latex is, after imbibition, contacted with acrylonitrile and the balance, if any, of the styrene. The amount of acrylonitrile added is usually up to 200 phr, generally 50 to 120 phr.

The latex of the rubbery backbone polymer may be obtained by a variety of methods, generally by an emulsion polymerisation of the monomer(s) constituting the rubbery backbone polymer. It is particularly preferred that the number average particle size (diameter) of the latex is at least 1500 Angstrom units, and desirably is in the range 2,000 to 2,800 Ang. The weight average is desirably 2500–3000 Ang. Preferably the swelling index of the polymer particles (as defined in U.K. Patent No. 965,851 and measured as defined therein except using toluene instead of benzene and a 200 mesh screen) is 10 to 30, desirably 12 to 20 and the gel content (as determined by coagulation, dissolution in toluene for at least 24 hours at 20°C and filtration through a 200 mesh gauze) is preferably 60 to 90 percent. Particularly satisfactory latices are those obtained using salt of an anionic emulsifier such as potassium, sodium or lithium oleate and/or the potassium or sodium rosin acid, especially when these are used with a secondary anionic emulsifier such as an alkali metal salt of a naphthalene sulphonic acid derivative (e.g., the sodium salt of naphthalene-sulphonic acid formaldehyde condensate). In such cases the total amount of emulsifier (including any secondary emulsifier) is in the range 0.5–1.5 parts per hundred parts of monomer (phm). The secondary emulsifier (where included) may be used in amounts of e.g. 0.3 to 1.0 phm. One method of preparing suitable rubbery polymer latices is disclosed in our co-pending application of Bennett and Duck entitled "LATEX PREPARATION" filed May 5, 1972 (corresponding to British application No. 14626/71) and the process of this invention is particularly applicable to latices produced by the process described therein.

The amounts and types of styrene and acrylonitrile used may be varied to obtain a variety of properties in the final graft copolymer. Generally where it is desired that the graft copolymer be thermoplastic, the rubber content is in the range 5 to 40 percent by weight of the copolymer, the styrene content is 40 to 80 percent by weight, and the acrylonitrile content 15 to 25 percent by weight. In some cases, however, it is desired that the graft copolymer be rubbery, in which case the grafted monomer contents are much lower. For example, 40 to 60 parts by weight (of polymer and monomers) (dry) of rubbery polymer latex is grafted with 60 to 40 parts by weight of acrylonitrile and styrene, the ration of styrene to acrylonitrile being in the range of, for example, 4:1 to 1:1, typically 3:1 to 2:1. In such cases the graft copolymer is usually used for incorporation into a glassy non-reinforced thermoplastic such as styrene-acrylonitrile copolymer (SAN) usually by a simple blending procedure.

Generally in step (2) of the process a further imbibing time of e.g. ½ hour to 1 hour is desirable to enable the acrylonitrile and the styrene (if any) to be absorbed into the rubber particles within the latex, thus providing the optimum degree of grafting to obtain adhesion between the phases and also to obtain a monomer composition, substantially the same as that in the matrix, thus increasing compatibility between the phases. Usually imbibition is carried out in both step (1) and step (2) at a slightly elevated temperature, e.g. 40° to 80°C, usually with gentle stirring.

The conditions under which the grafting reaction in step (3) is carried out are typically those known in the art, e.g. using 0.1 percent to 1 percent by weight on monomers of a free radical initiator such as potassium persulphate or a hydroperoxide or di-isopropylbenzene hydroperoxide which may be activated thermally or using, for example, ferrous iron. A modifier such as t-dodecyl mercaptan may be used, if desired, the amount of such modifier generally being from 0.03 to 0.50 phm. Generally the amount of modifier used affects the flow and impact properties of the final composition. In some cases satisfactory results may be obtained in the absence of modifier. Emulsifiers may be added, if desired, although these may be omitted relying on the emulsifiers already present in the rubber latex. Grafting is conveniently carried out at elevatted temperature, e.g. 70° to 90°C, the grafting time being adjusted as required to obtain the desired conversion. Generally conversions of 80 percent or more, e.g. 90 to 95 percent, are readily obtainable in periods of about 1 to 2 hours at 70° to 90°C. When the grafting reaction is completed, an antioxidant is generally added and the graft copolymer isolated by coaguluation. After washing and drying, the graft copolymer may be compounded with e.g. lubricants, fillers and/or thermoplastics as desired.

Graft copolymers obtained by the process of the invention, uncompounded or compounded as desired, may be moulded or shaped into a wide variety of articles as for thermoplastic materials in general.

The following Examples illustrate the invention:

EXAMPLE 1

A polybutadiene latex of solids content 29 percent by weight was prepared by the method disclosed in our co-pending Pat. application No. 14626/71 using the following formulation:

|  | Charge (phm-wt.) |
|---|---|
| Butadiene | 100 |
| Water | 180 |
| Dresinate¹ 731 (70% active) | 1.0 |
| Dispersol² LP | 0.2 |
| Anhydrous Potassium Carbonate | 1.15 |
| Sodium Hydrosulphite | 0.02 |
| Potassium Persulphate ) | 0.25 |
| activator |  |
| Water ) | 15 |

Notes
¹⁾Dresinate 731 is the sodium salt of disproportionated rosin acid (Hercules Powder Co.)
²⁾Dispersol LP is the sodium salt of a naphthalene-sulphonic acid formaldehyde-condensate (Imperial Chemical Industries Co.)

At the end of reaction the stability of the latex was adjusted by the addition of 0.75 parts per hundred parts of rubber (by weight) of Dispersol LP.

The number average particle diameter of this latex was 2,749 Ang. units and the weight average particle diameter was 2,949 Ang. units. The gel content and swelling index both measured as described herein were 66 and 22 percent respectively.

Acrylonitrile-butadiene-styrene copolymers (ABS) were prepared from this latex by the method according to the invention as follows:-

24 Gram (dry) portions of the latex were taken and admixed with varying amounts of styrene and imbibed at 65°C for a period. The amounts used and imbibing times are shown in the table. The balance of styrene to make a total of 50 grams was added after the imbibition period together with acrylonitrile (26 g) and t-dodecylmercaptan (0.4 g). The latex monomer mixture was maintained at a temperature of 65°C for a further period of about one-half hour.

An activator-peroxide mixture of:

| Activator | ( Dextrose | 0.365 g. |
|---|---|---|
|  | ( Ferrous sulphate | 0.006 g. |
|  | ( Sodium pyrophosphate | 0.300 g. |
|  | ( Water | 15.0 g. |
|  | ( Cumene hydroperoxide | 0.455 g. | and water (235 g) were added and the temperature raised to 85°C over a period of 20 minutes. After this time the reaction mixture was allowed to cool to 65°C over a period of about 1 hour. An antioxidant was added and the ABS graft copolymer recovered by coagulation, washing and drying. The conversion in each case was at least 90 percent, generally about 95 percent.

The notched impact strength using a one-fourth inch moulded bar (ASTM Test D 256-56-1961) and the

| Ex. No. | Initial Styrene Addition (g) | (phr) | Imbibition Time | Balance Styrene Addition (g) | Impact Strength (ft.lbs) | Rockwell Hardness |
|---|---|---|---|---|---|---|
| 1 a | 8 | 33.3 | 16 hrs. | 42 | 6.1 | 90 |
| 1 b | 10.4 | 43.5 | do. | 39.6 | 6.6 | 86 |
| 1 c | 12 | 50.0 | do. | 38 | 6.5 | 80 |
| 1 d | 24 | 100 | 30 mins. | 26 | 6.8 | 88 |
| 1 e | 37 | 154 | do. | 13 | 6.6 | 69 |
| 1 f | — | — | do. | 50 | 5.3 | 94 |

Rockwell Hardness (ASTM Test D 2785-65) were measured at 23°C for each ABS graft copolymer and the results are given in the Table.

Example 1 f is for comparison.

It can be seen that in Examples (a) to (e) a useful increase in impact strength of up to 28 percent can be obtained by imbibing some or all of the styrene in the absence of acrylonitrile.

What we claim is:

1. A process for preparing an acrylonitrile-butadiene-styrene (ABS) graft copolymer from a rubbery polybutadiene latex characterized by the steps of:
   1. admixing some or all of the styrene to be grafted, with the latex in the absence of acrylonitrile, the amount of styrene being at least 30 parts by weight per 100 parts of rubber,
   2. contacting the mixture so formed after an imbibing time of from 5 minutes to 20 hours before reaction is initiated with acrylonitrile and the balance, if any, of the styrene, and
   3. then initiating and continuing aqueous emulsion graft polymerization of the styrene and acrylonitrile in said mixture on to the polybutadiene steps (1) and (2) taking place before the initiation of graft polymerization in step (3).

2. A process according to claim 1 characterised in that the total amount of styrene used does not exceed 300 parts by weight per hundred parts of polybutadiene.

3. A process according to claim 1 characterised in that the amount of styrene admixed in step (1) of the process is 30 to 100 parts by weight per hundred parts of polybutadiene.

4. A process according to claim 3 characterised in that the imbibing time in step (2) of the process is 1 to 5 hours.

5. A process according to claim 1 characterised in that the amount of styrene admixed in step (1) of the process is 100 to 300 parts by weight per hundred parts of polybutadiene.

6. A process according to claim 5 characterised i that the imbibing time in step (2) of the process is 5 to 40 minutes.

7. A process according to claim 1 characterised in that the amount of acrylonitrile does not exceed 200 parts by weight per hundred parts of polybutadiene.

8. A process according to claim 1 characterised in that during the imbibing time, the mixture is maintained at a temperature of 40° to 80°C.

9. A process according to claim 5 wherein the graft copolymer product of step (3) is thermoplastic and contains 5 to 40% polybutadiene, 40 to 80 percent styrene and 15 to 25 percent acrylonitrile.

10. A process according to claim 1 wherein the graft copolymer product of step (3) is rubbery and contains 40 to 60 parts by weight of polybutadiene grafted with 60 to 40 parts by weight of acrylonitrile and styrene, the ratio of styrene to acrylonitrile being from 4:1 to 1:1.

11. A process according to claim 1 wherein the grafting is accomplished in an emulsion employing a free radical initiator.

* * * * *